United States Patent
Hoffmann et al.

(10) Patent No.: US 7,602,506 B2
(45) Date of Patent: Oct. 13, 2009

(54) METHOD FOR CONTACTLESSLY AND DYNAMICALLY DETECTING THE PROFILE OF A SOLID BODY

(75) Inventors: Manfred Hoffmann, Kassel (DE); Michael J. Walter, Voerde (DE); Dieter Hoffmann, Hamminkeln (DE); Andreas Brinkmann, Dinslaken (DE)

(73) Assignee: Gutehoffnungshutte Radsatz GmbH, Oberhausen (DE)

( * ) Notice: Subject to any disclaimer, the term of this patent is extended or adjusted under 35 U.S.C. 154(b) by 239 days.

(21) Appl. No.: 11/256,284

(22) Filed: Oct. 6, 2005

(65) Prior Publication Data

US 2006/0232787 A1    Oct. 19, 2006

Related U.S. Application Data

(63) Continuation-in-part of application No. PCT/EP2004/000295, filed on Jan. 16, 2004.

(30) Foreign Application Priority Data

Mar. 25, 2003  (DE) ................ 103 13 191

(51) Int. Cl.
*G01B 11/30* (2006.01)
(52) U.S. Cl. .................. 356/602; 356/601
(58) Field of Classification Search .......... 356/601–602
See application file for complete search history.

(56) References Cited

U.S. PATENT DOCUMENTS

| | | | |
|---|---|---|---|
| 4,932,784 A | | 6/1990 | Danneskiold-Samsoe |
| 5,247,338 A | * | 9/1993 | Danneskiold-Samsoe et al. .................. 356/3.07 |
| 5,636,026 A | | 6/1997 | Mian et al. |

FOREIGN PATENT DOCUMENTS

| | | |
|---|---|---|
| RU | 2 147 729 | 4/2000 |
| WO | WO 83/00738 | 3/1983 |

* cited by examiner

*Primary Examiner*—Tarifur Chowdhury
*Assistant Examiner*—Tara S Pajoohi
(74) *Attorney, Agent, or Firm*—Brinks Hofer Gilson & Lione (57) ABSTRACT

The invention relates to a method for contactlessly and dynamically detecting the profile of a solid body. At least one light beam is generated by a laser device and expanded to form a linear light band projected onto the moving surface of the solid body. Light reflected from the surface of the solid body is focused in an imaging device whose optical axis is at a fixed triangulation angle to the direction of projection of the laser device and which is arranged at a fixed based distance from the laser device. The reflected light is detected by a planar light receiving element at a frequency that is high by comparison with a speed of movement (v) of the solid body after which the measured values of the profile are obtained as a function of the triangulation angle and the base distance.

21 Claims, 9 Drawing Sheets

METHOD FOR CONTACTLESSLY AND DYNAMICALLY DETECTING THE PROFILE OF A SOLID BODY

CROSS REFERENCE TO RELATED APPLICATION

This application is a continuation-in-part of PCT international application no. PCT/EP04/00295 filed Jan. 16, 2004.

BACKGROUND AND SUMMARY

The present invention relates to a contactless method for dynamically detecting the profile of a solid body, in particular for the purpose of determining wear occurring on the solid body.

In order to determine wear, use is frequently made of so-called model test stands (for example from Amsler, Laffon-Eichinger etc.) on which specimens of the materials which are tested with regard to their tribological properties which in a friction pairing occurring for a specific application. However, the transfer of the characteristics determined in such a way to the particular application, for example to frictional bodies of very much larger dimensions than those of the specimens, encounters the difficulty that the tests can supply only orientation values, since the parameters affecting the wear constitute a complex set of conditions that never exactly corresponds on a model test stand to the real circumstances. Consequently tribological investigations on the real object are unavoidable for important applications, but frequently encounter the problem that a component whose wear is to be investigated must be removed after a certain operating period and then, for example, be investigated with regard to the wear occurring by determining the surface profile, and this is generally attended by a considerable outlay.

It is known that profiles of solid bodies can be detected, that is to say profilograms of the surface can be set up, by means of tactile methods, for example, by using a profilometer, the latter being a method that is based on a stylus making contact with the solid body and in the case of which the measuring range is below a millimeter and, for example, it is impossible to obtain measured values in the centimeter range. The measuring time in this case is several seconds per measuring point, and the method is disadvantageously unsuitable for a rugged measuring environment.

Various contactlessly operating optical methods are also known for statically detecting solid body profiles. Such methods and the associated apparatuses are also subsumed under the term of "topometric 3D metrology" as described, for example, in the monograph by Bernd Breuckmann entitled "Bildverarbeitung und optische Meßtechnik" ["Image processing and optical metrology"], Munich: Franzis', 1993, chapter 6. Laser triangulation is described in this case as one of the topometric methods, triangulation being understood as meaning a measurement method developed by Snellius in 1615 for the first time for the purpose of geodesy and in which a measured variable to be determined is determined indirectly from other measured variables by using trigonometric relationships.

In laser triangulation, a laser is used to project a point of light onto a measurement object. The light reflected from the object, in particular scattered light, is imaged on a light receiving element such as a position-sensitive detector, also termed a PSD—position-sensitive device. The geometry of the optical structure and the angle between the illuminating and observing directions are used to determine by triangulation the position, in particular the height position, of the object point under consideration. Nowadays, laser triangulation methods permit contactless measurements to be carried out in the distance range of up to a few meters with depth resolutions down to the μm range.

A development of laser triangulation is a known method, like those described in said monograph, in which the laser light beam is expanded to form a linear light band, a so-called light section. A planar detector such as, for example, a video camera, can be used in this case to detect the reflected light. The evaluation is performed, in turn, on the basis of triangulation. A characteristic of this method is a measuring range of the profile height from 1 mm up to 1 m in conjunction with a resolution from approximately 1 up to 50 thousandths of this range. Said monograph postulates a fundamental suitability of the light-section method for use in the case of continuously moving objects, but there are no details on the possible uses and limitations. However, in practice a method for dynamic, that is to say real-time, detection of the profile of a moving solid body encounters the problem that the movement gives rise to distortions of the surface to be measured that render a mode of procedure employing the classic triangulation methods impossible, since measured values corresponding to reality cannot thereby be obtained.

It is the object of the present invention to provide a contactless method for dynamically detecting the profile of a solid body of the type described at the beginning which permits short measuring times, comprises a measuring range covering at least three orders of magnitude, such as tenths of a millimeter, millimeters and centimeters, ensures a high measuring accuracy, and can be used under rugged operating conditions, in particular for determining wear of components.

This is achieved according to the invention by means of a method in which at least one light beam generated by a laser device and expanded to form at least one linear light band is projected onto at least one area of the surface of the solid body, the solid body being moved past the laser device, and the light reflected from the area of the surface of the solid body being focused in an imaging device, whose optical axis is at a fixed triangulation angle to the direction of projection of the laser device and which is arranged at a fixed base distance from the laser device, and is detected at a frequency that is high by comparison with a speed of movement of the solid body by means of a planar light receiving element, after which the measured values of the profile are obtained with a data processing device from signals output by the light receiving element as a function of the triangulation angle and the base distance by means of trigonometric relationships and in combination with correction values determined in accordance with the speed of movement of the solid body, and are stored in the data processing system as a profilogram.

Here, the solid body can be a rotationally symmetrical body executing a translatory, a rotating or, preferably, a rolling movement, in particular a vehicle wheel. The method according to the invention therefore constitutes an extremely advantageous possibility for determining profiles of a wheel as it passes by and of drawing conclusions on the wear therefrom.

In addition to the combination with the correction values determined in accordance with the speed of movement of the solid body, which advantageously permit a determination of profiles that is not "blurred" by the speed, it is possible in the case named as preferred, in particular, for the measured values of the profile to be obtained in combination with correction values determined in accordance with the area of the surface of the solid body so as to determine the profilogram without distortion.

It is advantageous for the purpose of completely determining the profiles when a number of profilograms are determined as component profilograms by using at least three laser devices that project light bands onto areas lying various sides of the surface of the solid body, and imaging devices assigned to said laser devices, the component profilograms are stored in the data processing system, and an overall profilogram is obtained therefrom. In the case of a solid body whose basic shape is substantially cylindrical or annular, such as a vehicle wheel, the at least three areas onto which the light bands are projected can preferably lie on the two end faces and on the lateral surface of the cylinder or ring. The profilogram, the component profilograms and/or the overall profilogram can then be compared with in each case with one or more reference profilograms, and the respective deviations from the respective reference profilogram can be ascertained, which constitutes a measure for the wear occurring or a measure as to whether the wear occurring is still in a tolerable range. In this context, an extrapolating statement as to how long a further period of stress still seems unobjectionable or as to when a renewed test seems necessary can also be made with the aid of correlative combinations between the period of stress of the solid body that has occurred and the wear ascertained.

Furthermore, it is advantageous when the profilogram, the component profilograms, the overall profilogram, the respective reference profilogram and/or the respective deviations are referred to a fixed long-term invariant geometric base quantity such as a non-wearing wheel rim inside diameter. It is, for example, possible in this way to represent the wear area as a development on which the height profile is depicted with reference to the base quantity with the aid of suitable means of representation. For example, the profilogram, the component profilograms, the overall profilogram, the respective reference profilogram and/or the respective deviations can be visualized in an indicating device such as a display.

In this case, the base quantity can advantageously be determined from at least three measured values that are likewise determined by contactless and dynamic measurements on the moving solid body and are undertaken in the same way as the detection of the profilogram or the detection of the component profilograms. For this purpose, there is a possibility that either the measurements on the moving solid body are performed in prescribed time intervals at least three instants by means of a single light beam expanded to form a linear light band, or that the measurements are performed simultaneously by means of at least three light beams respectively expanded to form a linear light band in conjunction with the prescribed distance of the areas of the surface of the solid body onto which the light bands are projected.

Use may advantageously be made as light receiving elements of devices that supply digitized signals, such as trigger-controlled CCD cameras, or position-sensitive detectors (position-sensitive devices), such as photodiode arrays. It is to be ensured here in the first case that the light receiving element is sensitive to the light intensity, while in the second case that the light quantity supplies adequate signals.

As to the laser device used in accordance with the invention, the following characteristics have proved to be particularly advantageous:

regarding the aspect of a high reproducibility of the results and a high measuring accuracy: wavelength of the light band generated in the range of 400 nm to 1000 nm, in particular in the range of 650 to 700 nm;

likewise regarding this aspect: power of the laser device in the range of 0.5 to 50 mW;

regarding the aspect of a high occupational safety (laser class 2 according to DIN EN 60825-1:2001-11): wavelength of the light band in the visible region and limiting value of the accessible radiation (GZS) of the laser device less than 1 mW—it is to be ensured thereby that the limiting value of the accessible radiation can be lowered to the required value by means of suitable measures in the case of a laser power that it is higher than 1 mW;

regarding the aspect of minimizing outlay for the method (costs): use of a cw (continuous wave) solid state diode, for example consisting of a semiconductor material such as GaAs, AlGaAs, InGaP, GaAsSb, InP, PbSnTe or the like, preferably a VLD (visible laser diode), similar to the way it is used in a laser pointer—a visible light band additionally facilitates the adjustment of the laser device relative to the solid body to be measured.

As to the measuring conditions of the method according to the invention, the following characteristics have proved to be particularly advantageous and/or optimum for a profilometry aimed at testing wear, it being possible to achieve a resolution of less than 2.0 mm, in particular of less than 0.5 mm, for the respectively determined profilogram, the component profilograms and the overall profilogram.

Width of the light band: in the range of 0.3 mm to 6.5 mm, in particular in the range of 0.8 mm to 2.2 mm—together with a possibly desired increasing mean working distance (measuring distance), divergence leads to an enlarged width of the light band that, however, reduces the measuring accuracy;

length of the light band: in the range of 50 mm to 750 mm, in particular in the range of 200 mm to 400 mm—in accordance with the geometry of the area that is to be measured of the surface of the solid body;

triangulation angle: in the range of 15° to 40°, in particular in the range of 200 mm to 30°, an enlarged angle increases the measuring accuracy, but also the risk of inhomogeneous illumination of the surface of the solid body and the occurrence of shadows;

base distance between the imaging device, in particular the midpoint of a focusing lens of the imaging device, and the optical axis of the laser device in the range of 30 mm to 450 mm, in particular in the range of 60 mm to 270 mm;

mean working distance of the laser device and/or of the imaging device from the area of the surface of the solid body onto which the light band is projected: in the range of 20 mm to 650 mm, in particular in the range of 150 mm to 350 mm;

speed of a possibly translatory movement of the solid body: less than 3.5 m/s, preferably less than 1.5 m/s;

angular velocity of a possibly rotating movement of the solid body: smaller than 15 s$^{-1}$, preferably smaller than 6 s$^{-1}$ and preferably constant;

frequency with which the light reflected from the surface of the solid body is detected by means of the light receiving element: in the range of 25 Hz to 100 kHz, preferably in the range of 1 kHz to 10 kHz.

As to the frequency, this must be tuned to the speed of movement of the solid body—a relatively high frequency reduces the influence of the speed of the solid body on the distortion of the signals of the light receiving element. Consequently, a correlative combination of the speed of movement with the frequency of the detection of the reflected light can advantageously be performed in order to determine the correction values determined in accordance with the speed of movement and which can, in particular, be vectorial factors that are proportional to the speed of movement and correspond to the nature of the measured values of the profilogram and/or summands. There is advantageously no need to bear nonlinearities in mind for the specified ranges of the speed of the movement of the solid body in this case.

The correction values determined in accordance with the area of the surface of the solid body can, in particular, be vectorial factors determined as a function of a radius of the rotationally symmetrical body and/or summands, said radius possibly being the same long-term invariant geometric base quantity that serves as reference quantity for determining the profilograms.

Further advantageous designs of the invention are contained in the subclaims and in the following detailed description.

The invention will be explained in more detail with the aid of an exemplary embodiment illustrated by the attached drawing, in which.

In the various figures of the drawing, identical parts are always provided with identical reference symbols, and so they are also generally described only once in each case.

Figure 1:
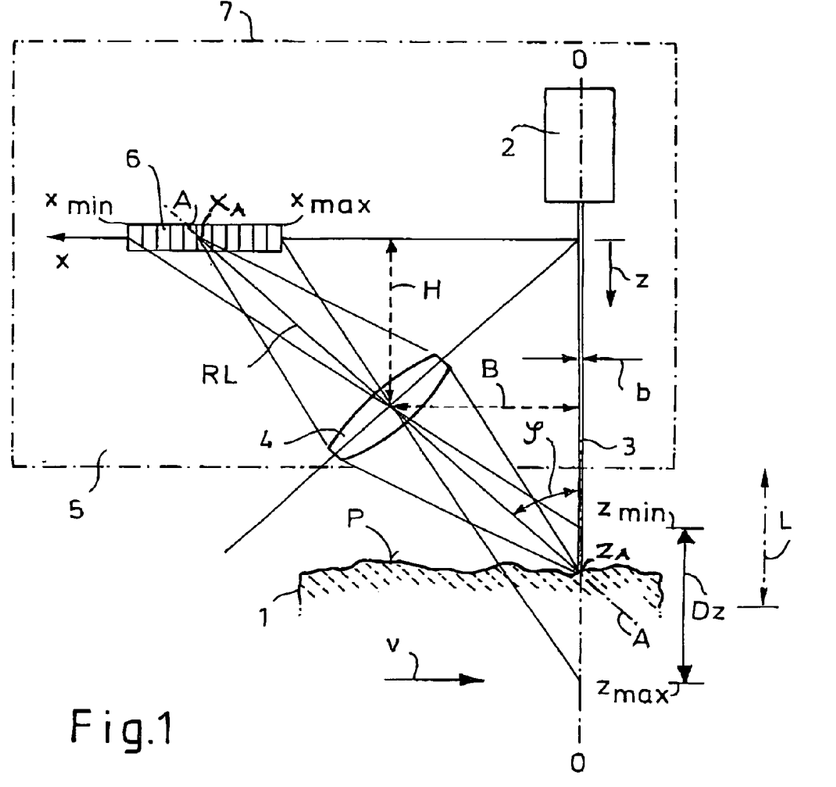
FIG. 1 shows in a schematic side view a representation of the principle for illustrating the method according to the invention.

As shown in a two-dimensional illustration firstly in FIG. 1 with regard to the measurement object of a solid body 1 moving at the speed v, a light beam emanating in accordance with the method according to the invention from a laser device 2 is focused by means of an optics (not illustrated) such that the width b of the beam lies in a prescribed range in a measuring range Dz that results from the difference of a maximum measurable value $z_{max}$ and a minimum measurable value $z_{min}$ of the depth or the profile height z. The light beam is expanded in this case to form a light band 3, as is shown in a three-dimensional illustration in FIG. 2.

At the location of impingement $z_A$ of the light band on the surface of the solid body 1, diffuse scattered light (reflected light RL) forms a measuring spot that can also be perceived from directions which deviate from the direction of incidence determined by the optical axis O-O of the laser device 2.

If the measuring spot is now imaged onto a planar light receiving element 6 at the triangulation angle φ by an appropriate focusing lens 4 of an imaging device 5, a position $x_A$ of the image spot is set up between a minimum value $x_{min}$ and a maximum value $x_{max}$ on the light receiving element 6 depending on the distance of the location of impingement $z_A$.

In addition to the permanently set triangulation angle φ, the geometry of the structure of the device used for the method according to the invention is determined by a fixed base distance B of the optical axis A-A of the focusing optics 4 of the imaging device 5 from the position of the laser device 2—fixed by the optical axis O-O thereof.

By applying trigonometric relationships, the distance of the location of impingement $z_A$, that is to say the distance of the surface of the solid body 1 from the laser device 2, can be determined from the equation $$z_A = H/(1 - B/x_A) \tag{1}$$

from the measured image spot position $x_A$, H illustrating a distance of the focusing lens 4 of the imaging device 5 from the light receiving element 6 thereof, as is illustrated in FIG. 1.

The relative measuring accuracy $dz_A/z_A$ is yielded in this case as $$dz_A/z_A = 1/(1 - x_A/B) * dx_A/x_A \tag{2},$$

the relative resolution $dx_A/x_A$ of the image spot position depending on the speed v of the solid body in relation to a frequency f with which the reflected light RL is received by the image receiving element 6, and on the signal noise and the type of the light receiving element 6. Here, the quantity $dz_A$ in equation (2) constitutes an absolute value of the measuring accuracy.

In order to increase the resolution, the final measured values $z_B$ of the profile (denoted in FIGS. 1 and 2 by P) are obtained by combining the values $z_A$ with correction values Kv that are determined in accordance with the speed of movement v of the solid body 1 and which can be, in particular, vectorial factors proportional to the speed of movement v and/or summands. Here, a correlative combination of the speed of movement v with the frequency f of the detection of the reflected light RL is performed in order to determine the correction values Kv determined in accordance with the speed of movement v.

By varying the above-described geometry, in particular of the base distance B, the triangulation angle φ and/or a mean working distance (illustrated in FIG. 1 by the length L) of the imaging device 5 or the laser device 2 from the area of the surface of the solid body 1 onto which the light band 3 is projected, it is advantageously possible for the measuring range Dz and the measuring accuracy $dz_A/z_A$ associated therewith to be set freely in a simple way by the appropriate selection of the geometric quantities of the structure. Here, the individual devices need not necessarily, as illustrated in FIG. 1, be surrounded by a common housing 7. An enlargement of the measuring range Dz has the effect in this case of reducing the measuring accuracy, and vice versa.

In the design illustrated, a SONY HCC 400 camera is used as light receiving element 6. Since the resolution is dependent on the size of the measuring range, that is to say on the measuring range Dz, this means for the dimensioning of a device for carrying out the method according to the invention that the number of detecting camera heads is directly dependent on the required or selected resolution.

Figure 2:
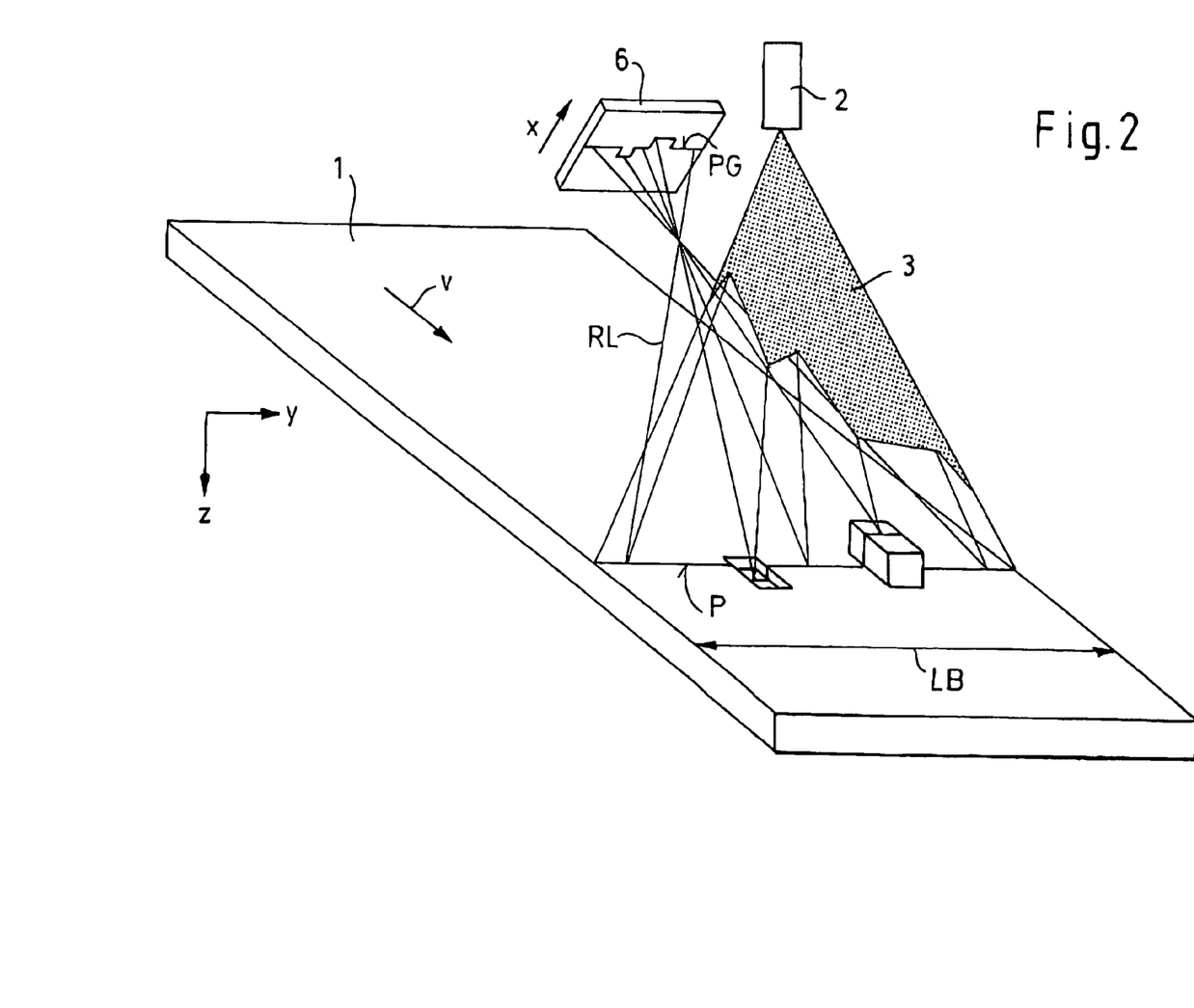
FIG. 2 shows, in a schematic perspective view, a further fundamental representation for illustrating the method according to the invention.

As already explained and illustrated in FIG. 2, the system so far regarded as only two dimensional will be regarded in three dimensions in order to record the topography of a three-dimensional solid body 1. That is to say, work will be carried out using a laser beam widened to form a light band 3. The term light-section method is used. After the reflected light RL has been detected by the planar light receiving element 6, and in a data processing device (not illustrated), such as a PC, the measured values of the profile P are determined from signals output by the light receiving element 6 and by taking account of the triangulation angle φ and the base distance B, and said measured values are stored in the data processing system as profilogram PG. Such a profilogram PG is represented in the schematic illustration of FIG. 2 by the correspondingly designated polyline on the light receiving element 6. Profilograms from real measurements are shown in different types of illustration in FIGS. 7 and 8.

A commercially available linear laser module L200 with a line length LB (FIG. 2) of 300 mm and a line width b (FIG. 1) of 1.5 mm, a laser power of 30 mW and having visible red light (wavelength 680 nm) was used as laser device 2 projecting light bands 3 onto the areas lying on the surface of the solid body 1.

As already mentioned above, FIG. 3 shows a typical application of the method according to the invention, specifically for determining wear. The illustration reproduces a perspective view of a wear test stand 8 that is designed for wheels 1a as solid body 1 to be measured that roll on rails 9 and are moved past with translatory speed v and an angular velocity ω.

Figure 3:
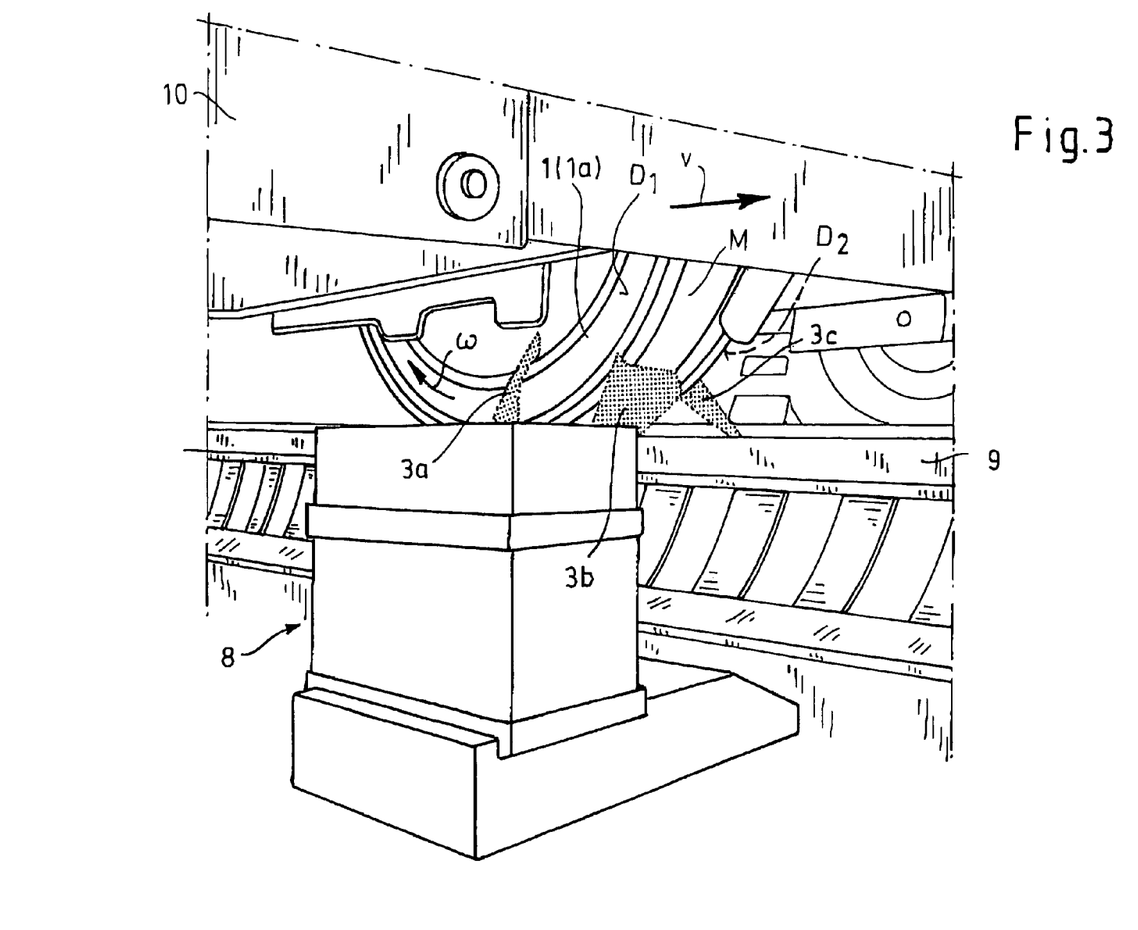
FIG. 3 shows a perspective view of a wear test stand for wheels of a railbound vehicle, such as railway wheels, the method according to the invention being applied.

It may be seen from the graphic illustration that provision is made with this wear test stand 8 to determine a number of profilograms PG as component profilograms (also denoted in FIG. 7 as $PG_a$, $PG_b$ and $PG_c$) by using three laser devices 2 that project light bands 3a, 3b, 3c onto areas lying various sides $D_1$, $D_2$, M of the surface of the solid body 1, and imaging devices 5 assigned to said laser devices are determined. The component profilograms $PG_a$, $PG_b$, and $PG_c$ can be stored in the data processing system, and an overall profilogram GPG can be obtained therefrom.

Figure 4:
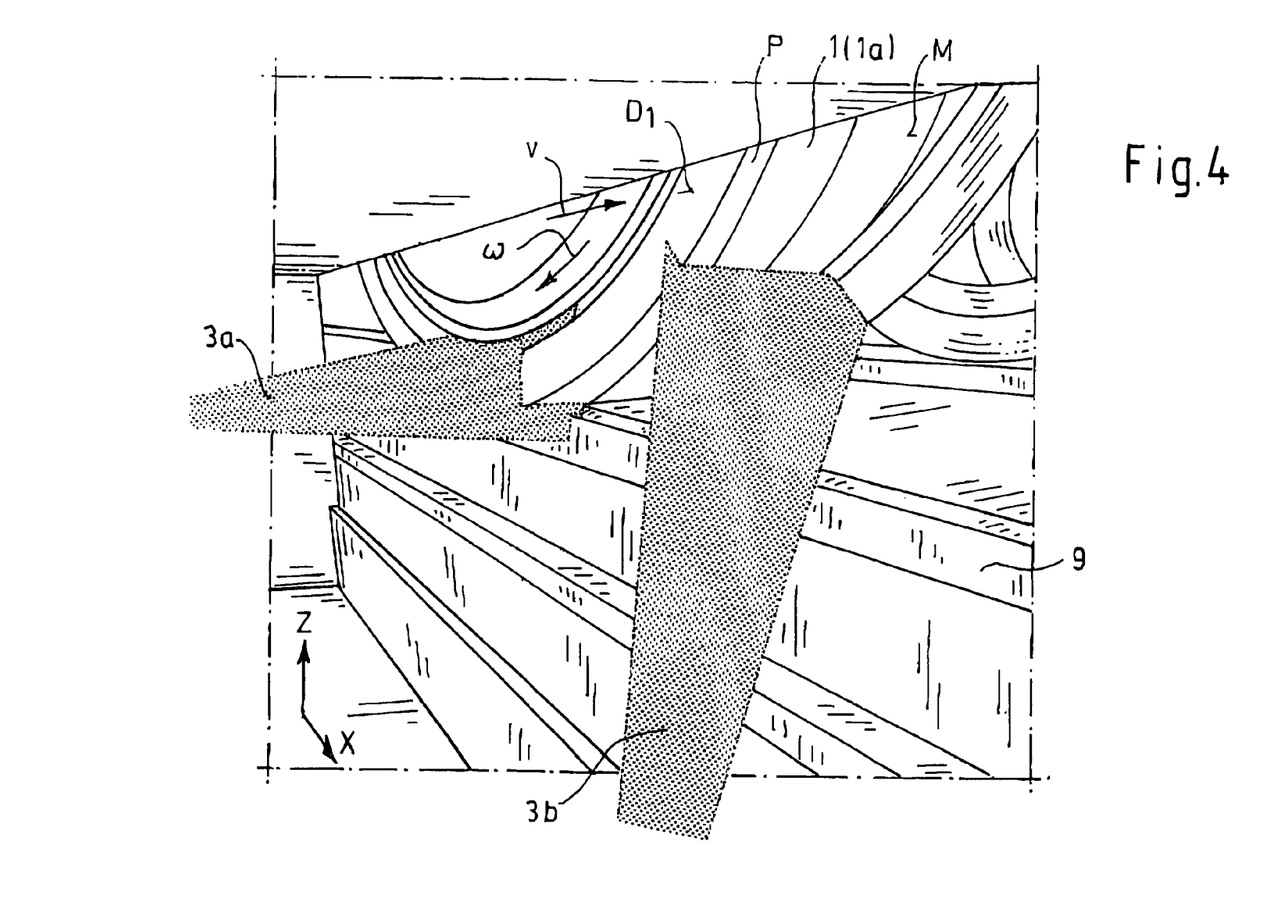
FIG. 4 shows a detail corresponding to FIG. 3 from an angle of view selected from the front, with regard to the direction of movement, onto the outside of a wheel.

The wheel 1a of the railbound vehicle 10 constitutes a rotationally symmetrical solid body 1 whose basic shape is substantially cylindrical or annular, the three areas onto which the light bands 3a, 3b, 3c are projected lying on the two end faces $D_1$, $D_2$ and on the lateral surface M of the cylinder or the ring. As shown in FIG. 3 and in detail in FIGS. 4 and 5, the three light bands 3a, 3b, 3c do not need to form a closed polyline in order to determine the overall profilogram GPG. It is also not required that the light band 3b projected onto the lateral surface M runs parallel to the axis of the wheel 1a. A corresponding deviation from axial parallelism can be compensated by obtaining the measured values $z_B$ of the profile P in combination with correction values Ko determined in accordance with the area of the surface of the solid body.

Figure 5:
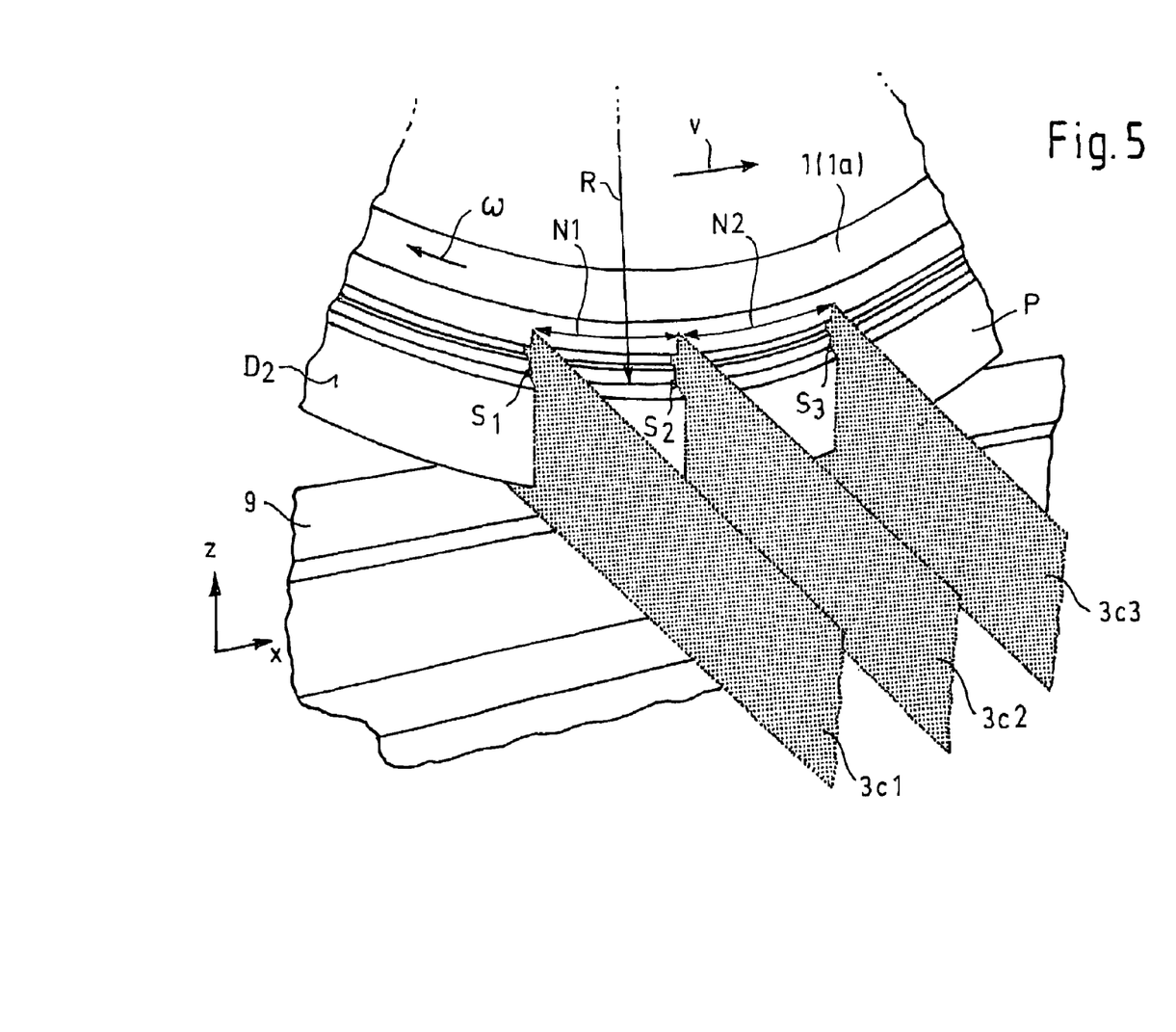
FIG. 5 shows a detail corresponding to FIG. 3, but from an angle of view selected from the rear, with regard to the direction of movement, onto the inside of a wheel.
Figure 6:
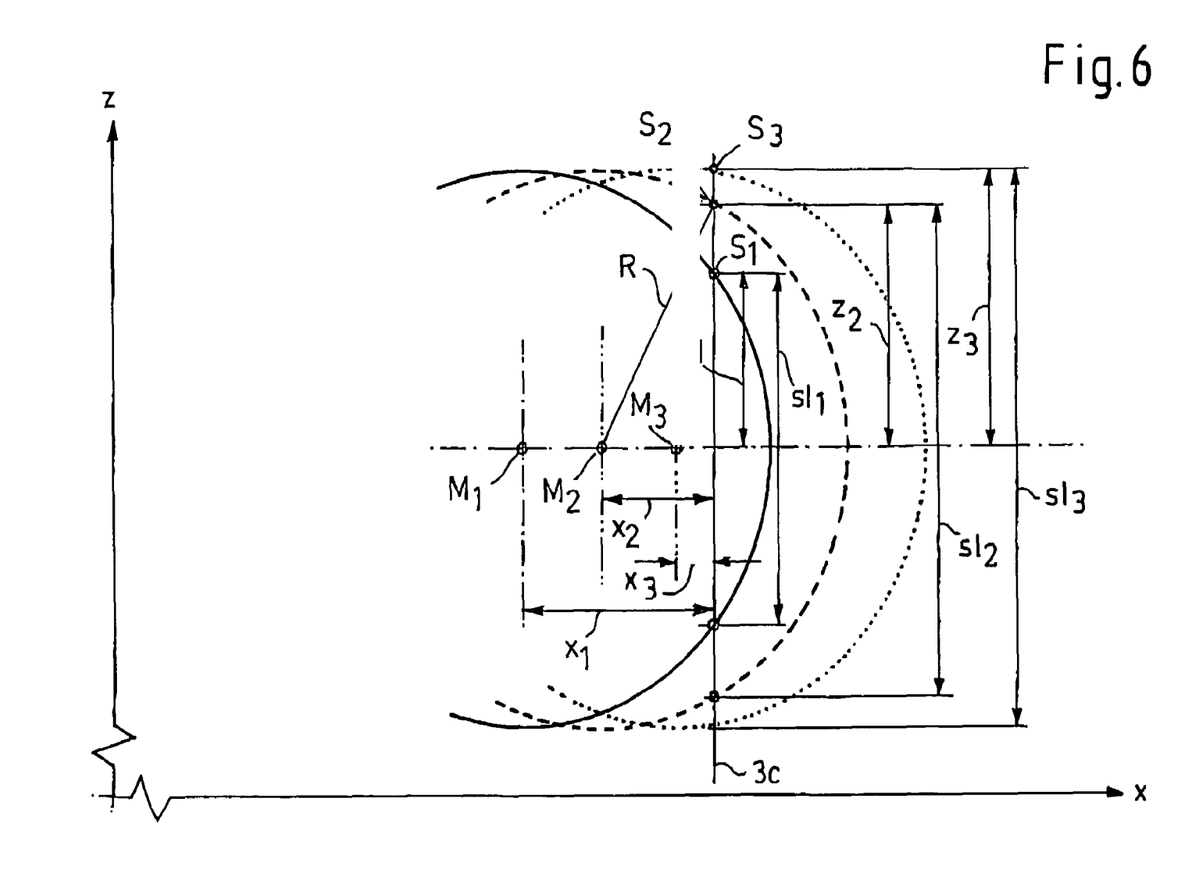
FIG. 6 shows a schematic of the mode of procedure when determining a geometric base quantity to which a profilogram determined in accordance with the invention can be referred.

FIG. 5 illustrates the first, and FIG. 6 the second, of the abovementioned possibilities of determining a rim inside radius R of the wheel 1a as a fixed, long-term invariant geometric base quantity to which the profilogram PG, the component profilograms $PG_a$, $PG_b$, $PG_c$ and the overall profilogram GPG can be referred. Here, the radius R is determined in both cases from at least three measured values $z_1$, $z_2$, $z_3$, that are determined by contactless and dynamic measurements on the moving wheel 1a and are undertaken in the same way as the detection of the profilogram PG or the detection of the component profilograms $PG_a$, $PG_b$, $PG_c$.

In accordance with FIG. 5, the contactless dynamic measurements at the rolling wheel 1a are undertaken simultaneously by means of at least three light beams, respectively expanded to form a linear light band 3c1, 3c2, 3c3, in conjunction with respectively prescribed distances N1, N2 of the areas of the surface of the solid body 1 onto which the light bands 3c1, 3c2, 3c3 are projected.

In accordance with FIG. 6, the contactless and dynamic measurements on the rolling wheel 1a are undertaken in prescribed time intervals Δt at least three instants $t_1$, $t_2$, $t_3$ by means of a single light beam expanded to form a linear light band 3c.

The measurements are therefore performed in a unidirectional fashion, that is to say given the same alignment of the respective light bands 3c, 3c1, 3c2, 3c3, in each case at three points $S_1$, $S_2$, $S_3$, three measured values $z_1$, $z_2$, $z_3$ lying on a circular arc of radius R being determined as ordinate values of the points $S_1$, $S_2$, $S_3$ in a Cartesian coordinate system. The measured values $z_1$, $z_2$, $z_3$ assigned to the points $S_1$, $S_2$, $S_3$ in the way shown in FIG. 6 correspond respectively to a measured length of the linear light band 3c or 3c1, 3c2, 3c3. The measured lengths of the linear light band 3c or 3c1, 3c2, 3c3 can be transformed without a problem for this assignment in such a way that the measured values $z_1$, $z_2$, $z_3$ respectively represent half the length of a chord $sl_1$, $sl_2$, $sl_3$ through the circular arc. The abscissa values $x_1$, $x_2$, $x_3$ associated in each case with these measured values $z_1$, $z_1$, $z_3$—and shown in FIG. 6 respectively as distances, present at the three instants $t_1$, $t_2$, $t_3$, of the center of the circle $M_1$, $M_2$, $M_3$ from the light band 3c—result either in the first case from the distances N1, N2 in accordance with FIG. 5, or in the second case from the time intervals Δt prescribed by the three instants $t_1$, $t_2$, $t_3$ of the measurement through multiplying the time intervals Δt by the angular velocity ω. The angular velocity ω can in this case either be permanently prescribed, or likewise be determined by contactless and dynamic measurements on the rolling wheel 1a by means of one or more linear light bands 3. The evaluation is facilitated when the speed, that is to say on the one hand the rotating, and thus on the other hand also the translatory movement of the wheel 1a, is constant.

After the determination of the measured values $z_1$, $z_2$, $z_3$, the reference radius R of the rolling wheel 1a can be determined from the following system of equations:

$$R^2 = X_1^2 + Z_1^2 \qquad (3)$$

$$R^2 = x_2^2 + z_2^2 \qquad (4)$$

$$R^2 = x_3^2 + z_3^2 \qquad (5)$$

$$x_1 - x_2 = k^*(x_2 - x_3) \qquad (6)$$

The variables R, as well as $x_1$, $x_2$ and $x_3$, represent unknowns in each case herein. The variable k in equation (6) is a known factor corresponding to the prescribed time intervals Δt or the distances N1, N2 of the areas of the surface of the wheel 1a and assumes the value 1 for the preferred case of constant time interval Δt and equidistant distances N1, N2.

The radius R determined can serve, on the one hand, as base line for the measured values $z_B$ of the profile height, which are determined on the lateral surface M of the wheel 1a, while on the other hand it is possible to use this radius R in order to determine correction values Ko that are taken into account in accordance with the area, illuminated by the light band 3 or 3a, 3b, 3c, 3c1, 3c2, 3c3, of the surface of the solid body 1. The necessity of taking account of such correction values Ko results, for example, from the fact that the chords $sl_1$, $sl_2$, $sl_3$ in FIG. 6 in each case define different central angles, thus giving rise to different local profile distortions. Here, the central angles lie at between 0° in the first extreme case, when the light band 3c forms a tangent to the circumference of the circular arc of the wheel 1a under consideration, and at 180° in the other extreme case, when the light band 3c coincides with the diameter 2R of the circular arc of the wheel 1a under consideration. The greatest chord length $sl_3$ contains the most information relating to the profile to be determined, and has the least local distortion.

Figure 7:
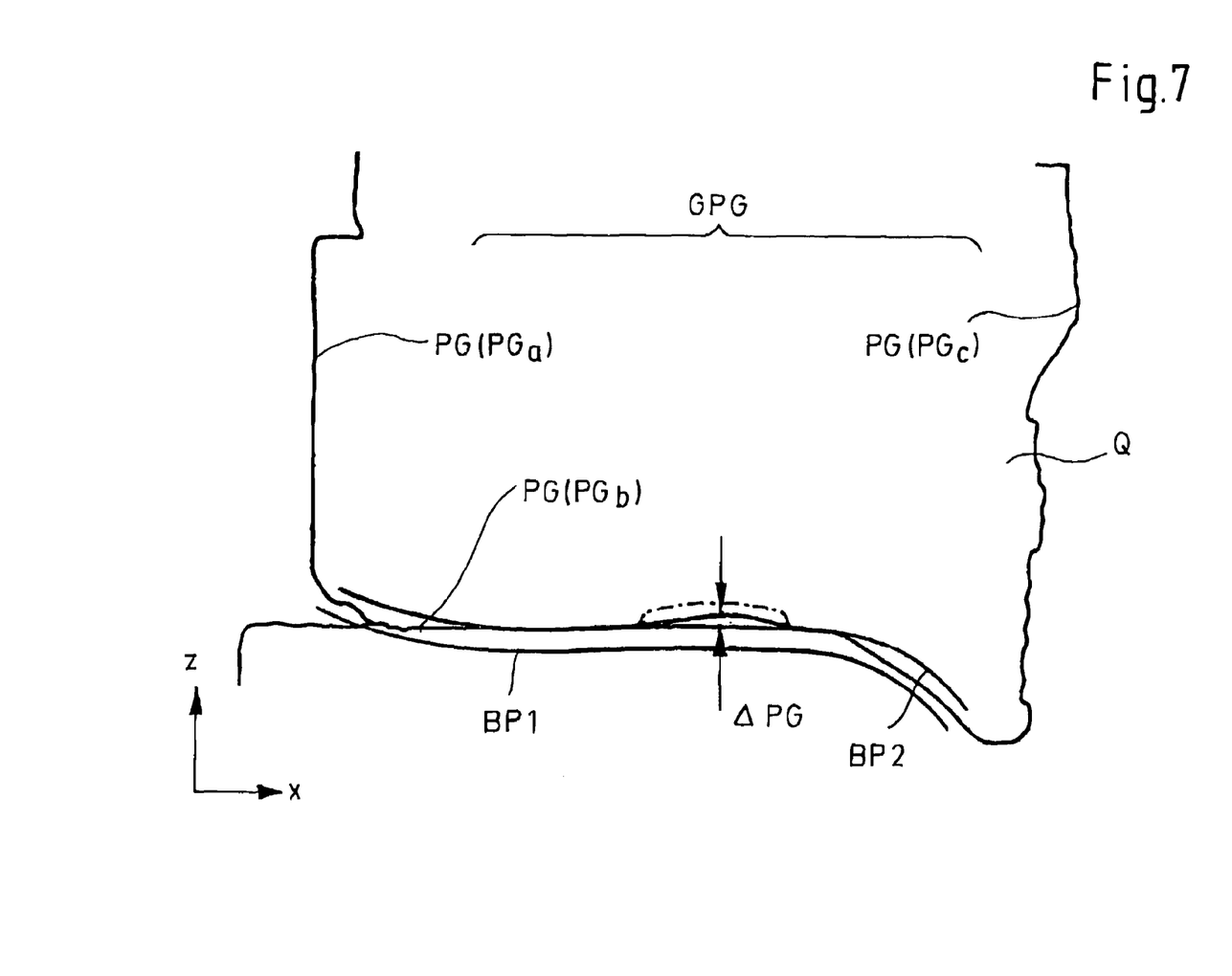
FIGS. 7 and 8 show illustrations of profilograms determined in accordance with the invention.

For these reasons, it is therefore extremely advantageous when the overall profilogram GPG, illustrated in FIG. 7, of a rolling solid body 1, the wheel 1a in the case illustrated, is obtained from three component profilograms determined simultaneously at a detection instant $t_k$ by the two end faces $D_1$, $D_2$ and on the lateral surface M, the detection instant $t_k$ of the individual component profilograms being selected in such a way that a mean value $z_k$-$z_3$ in the present case—determined at this detection instant $t_k$ assumes a maximum from at least three measured values $z_1$, $z_2$, $z_3$ that lie on a circular arc of radius R in one of the end faces $D_1$, $D_2$ and are respectively determined at successive instants $t_1$, $t_2$, $t_3$ and in a unidirectional fashion from the respective length LB of the linear light band $3c$, $3c1$, $3c2$, $3c3$, and that respectively correspond to half the length of a chord $sl_1$, $sl_2$, $sl_3$ through the circular arc. Of course, the application of this criterion for the selection of the detection instant $t_k$ is not limited to three measured values $z_1$, $z_2$, $z_3$. Given a basis of more than three measured values $z_1$, $z_2$, $z_3$, it is even possible to achieve yet better results if the largest half chord length $sl_3$ determined deviates less from the radius R or assumes the same value as the radius R.

FIG. 7 further shows that the respective profilogram PG, the component profilograms $PG_a$, $PG_b$, $PG_c$ and/or the overall profilogram GPG are compared in each case with one or more reference profilogram(s)—in the graphic illustration, a reference profilogram BP1 for maximum measured values $z_B$ of the profile P and a reference profilogram BP2 for minimum measured values $z_B$ of the profile P—and the respective deviations $\Delta PG$ from the respective reference profilogram BP1, BP2 can be ascertained. In the case illustrated, such deviations occur in the region illustrated with dots and dashes. The reference profilograms BP1, BP2 can preferably be permissible desired dimensions, but a reference profilogram BP1, BP2 could also be a stored data record of measured values $z_B$ from an earlier measurement such that the respective deviations $\Delta PG$ provide information on the extent of wear that has occurred since the prior measurement.

Figure 8:
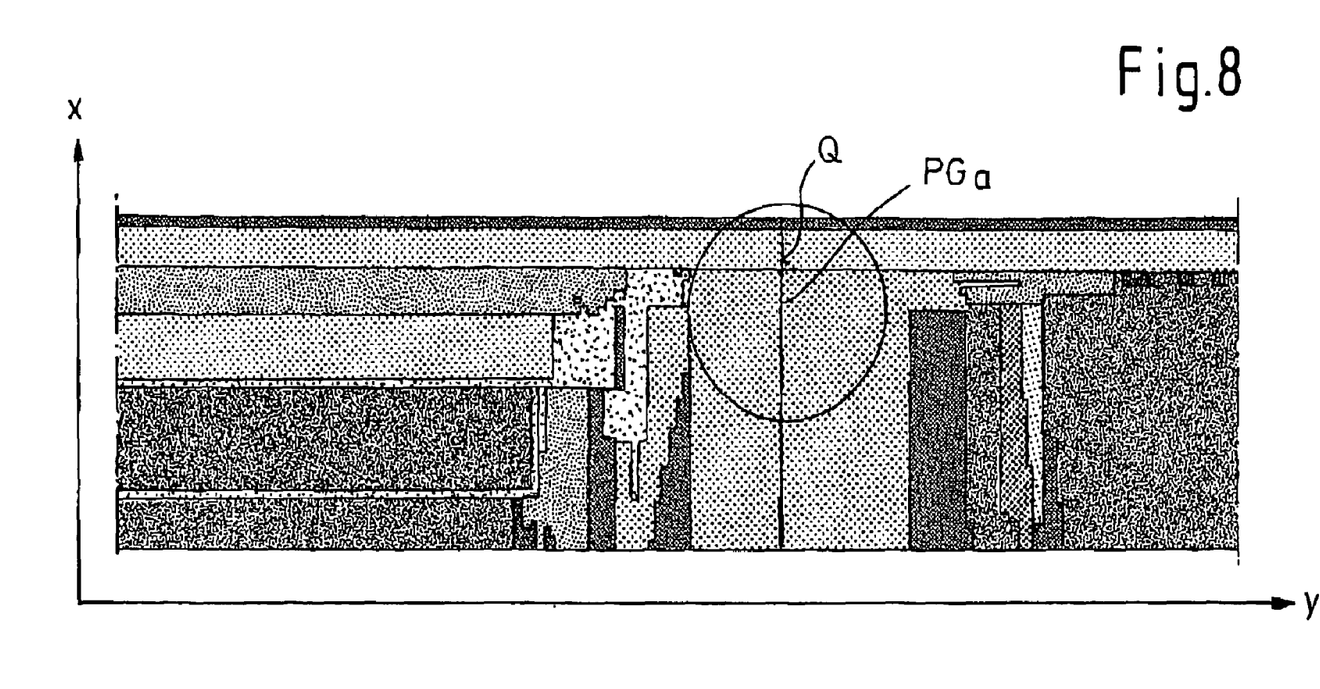

Whereas the illustration of the profile P in FIG. 7 is only a two-dimensional one in which the measured values $z_B$ of the profile P are illustrated as a polyline—vectors x, z—over the cross section Q of the wheel $1a$, the illustration of the profile P in FIG. 8 depicts the three-dimensional character of the method according to the invention. By means of various gray values, FIG. 8 illustrates the measured values $z_B$ of the profile P as vectors x, y, z via the development of the end face $D_1$ of the wheel $1a$ determined with the aid of the abovementioned radius R. The absolute value of the resolution $dz_A$ according to equation (2) is at less than 0.5 mm, for example at 0.4 mm. The line denoted by Q and marked by encirclement here denotes the cross section Q, illustrated in FIG. 7, of the wheel $1a$, the component profile $PG_a$ in accordance with FIG. 7 being—as specified—present at this point. In order to increase clarity it is also possible to use colors for the illustration in a suitable display instead of the gray values.

The method according to the invention advantageously enables a profile P to be detected in an extremely short determination time. Thus, a three-dimensional overall profilogram GPG can be set up in each case in a time of 5 seconds with the aid of laser devices 2, arranged on both sides of rails 9 on which a railbound vehicle 10 rolls past, and imaging devices 5 for five rotary frames, that is to say ten wheel sets and thus 20 wheels $1a$.

Figure 9:
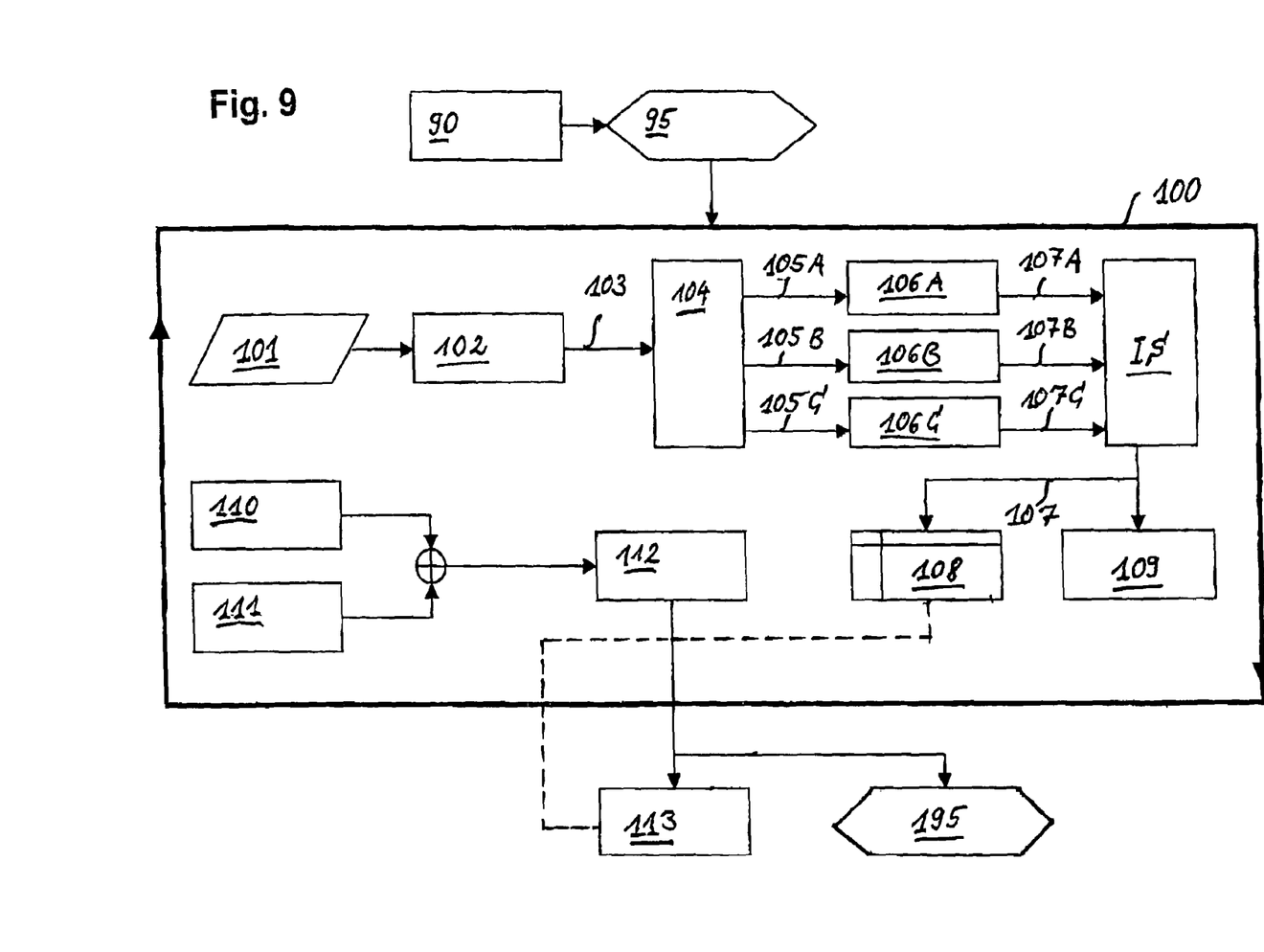
FIG. 9 shows a program procedure for applying the method according to the invention.

The program procedure, illustrated in FIG. 9, for applying the method according to the invention is tailored, in particular, to the contactless detection of the profile of wheels of a railbound vehicle, such as railroad wheels. As has been mentioned, such a wheel is illustrated in FIG. 3 by way of example on the railbound vehicle 10 in a fashion provided with the reference symbol $1a$.

The program procedure comprises, in particular, a receiving loop 100 for dynamically detecting the profile P of the solid body 1 or $1a$, which is set in operation after a request 90 from a server for system start operations, which are symbolized in FIG. 9 by the boxes marked with the reference symbol 95 and can comprise the driving of traffic lights for the railbound vehicle 10, the activation of a trigger for image triggering in the light receiving element 6 and switching on the laser device 2.

In this case, provided in the receiving loop 100 by a laser distance sensor 101, which is, in particular, the light receiving element 6, downstream of signal conditioning 102 is in particular a distance signal 103, that is to say a determination of states of the solid body 1, $1a$ such as the distance from the laser device 2 and a temporal variation in this distance is performed as first derivative (speed) and—in the event of accelerated movement, if appropriate—also as second derivative of the path with respect to time (acceleration). Electric voltages can feature in this case as results of an analog provision by the laser distance sensor 101 in the signal conditioning 102.

In accordance with the determined initial states of the solid body 1, $1a$ there is then performed in the method step of "signal evaluation" 104, in particular from the distance signal 103, the determination either—with reference to the method described in conjunction with FIG. 5—of a detection instant at which three signals, output for three different light bands $3c1$, $3c2$, $3c3$ from the light receiving element 6 and intended further for obtaining the measured values $z_B$ of the profile P, are firstly received or—with reference to the method described in conjunction with FIG. 6—of at least three instants $t_1$, $t_2$, $t_3$ at which signals output for only one light band $3c$ from the light receiving element 6 and which are used further to obtain the measured values $z_B$ of the profile P, are firstly received.

This means in detail that one instance each of image triggering 106A, 106B, 106C is performed under the action of initiators 105A, 105B, 105C—depending on method—in a light receiving element 6, for example in the camera, or in three light receiving elements 6. The images recorded in this case can here be buffered in a frame buffer, that is to say a preferably cyclically operating, sequential image memory, for example of the camera.

The imaging triggering 106A, 106B, 106C should preferably be performed in this case with the criterion of being as near in time as possible to the instant at which the determination of the initial states of the solid body 1, $1a$ was performed, since, in a way advantageous for the signal evaluation, the signals respectively present differ for this instance only slightly, that is to say, in particular, the distance from the laser device 2 has changed only slightly.

The signal evaluation 104, preferably of the distance signal 103, can be undertaken here, in particular, by means of a so-called easy logic that can advantageously be integrated in an existing data processing device. Easy logic is understood here as a programmable device that permits various time-based logic sequences to be configured. Such devices, which can also be subsumed under the name PLD—Programmable Logic Devices—and, in particular, under the name of SPLD—Simple Programmable Logic Devices—enable a user to establish, with the aid of suitable software, preferably a relay ladder logic,—for example by in-system programming (ISP)—a logic and temporal relationship, previously determined in a desired way, between one or more inputs, in the present case, in particular, the distance signal 103, and one or more outputs, in the present case, in particular, the initiators 105A, 105B, 105C. Thus, in order to implement the method according to the invention, it is possible to stipulate in the easy logic a time range in which image recording appears permissible and preferably also optimum from the point of view of the image quality to be expected. This time range can be, for example, a range in which the correction values Ko determined in accordance with the area of the surface of the solid body 1, 1a, and/or the correction values Kv determined in accordance with the speed of movement v of the solid body 1, 1a—preferably as permanently prescribed values, that is to say without dynamization—are valid. By comparison with discrete logic devices, the use of easy logic leads to a reduced hardware outlay (printed circuits, plugs, connections) and to a reduced mounting outlay (wiring, bonding) when producing circuits, and to a more compact possible design.

Downstream of the image triggering 106A, 106B, 106C, in which the images are acquired, in particular, as image matrices 107A, 107B, 107C, an image selection—in particular one that is dependent on the speed of the solid body 1, 1a—is made, for which reference symbol "IS" (Image Selection) stands in the program procedure. The image matrix 107 that is present in the result of the image selection IS and is representative of the measured values $z_B$ of the profile P is fed to a memory 108—preferably with the respectively associated values of the distance or measuring point and/or the time, for example one of the instants $t_1$, $t_2$, or $t_3$. A timer is reset 109 here, at the same time. The operations described proceed again as illustrated by the receiving loop 100.

The condition checks illustrated by the boxes designated with the reference symbols 110 and 111 serve as abort criteria for the processes in the receiving loop 100. It is checked (box 110) here, on the one hand, whether the timer has already been running more than 10 s and, on the other hand, whether all the axles of the railbound vehicle 10 have been recorded (box 111). If one of these conditions applies, the image recording is stopped (box 112). The question as to whether the timer has already been running more than 10 s is aimed at establishing whether the solid body 1 or 1a has possibly come to a standstill. After the stopping 112 of the image recording, the stored image data 108 can be sent to the server (box 113). System stop operations such as "switch off trigger", "switch off laser device 2" and "drive traffic lights for the railbound vehicle 10" can be performed at the same time, these being symbolized by the box designated with the reference symbol 195.

Here, the appropriate hardware can be incorporated in the test stand 8 in accordance with FIG. 3 in order to implement the operations illustrated in the program flow according to FIG. 9, in particular the receiving loop 100, it thereby advantageously being possible to implement a client-server circuit in the case of which the client is located on the rail 9 and the server at a spatially remote location.

The present invention is not limited to the exemplary embodiment illustrated, but covers all means and measures having the same action as in the meaning of the invention. Thus, there is a further possibility in the application of so-called stripe projection methods with the use of structured or coded illumination. These methods are likewise based on the triangulation principle, the entire solid body 1 being illuminated by a projector, corresponding to the laser device 2, with a computationally prescribed light pattern. During recording, the light pattern is varied in a specific way such that the topography can be determined from the resulting intensity distribution of the recorded image.

Furthermore, the person skilled in the art can supplement the invention by means of additional advantageous measures without departing from the scope of the invention. Thus, suitable software modules can be used to execute all the arithmetic operations—such as those of the specified equations (1) to (6) in the data processing device.

Furthermore, the invention is not limited to the combination of features defined in claim 1, but can also be defined by any other desired combination of specific features disclosed as a whole. This means that in principle virtually any individual feature of claim 1 can be omitted and/or replaced by at least one individual feature disclosed at another point in the application. To this extent, claim 1 is to be understood only as a first attempt at formulation for an invention.

LIST OF REFERENCE SYMBOLS

1 Solid body
1a Wheel
2 Laser device
3, 3a, 3b, 3c, 3c1, 3c2, 3c3 Light band
4 Lens of 5
5 Imaging device
6 Light receiving element
7 Housing
8 Wear test stand
9 Rail
10 Railbound vehicle
90 Request from the server
95 System start
100 Receiving loop
101 Laser distance sensor
102 Signal conditioning
103 Distance signal
104 Signal evaluation
105A, 105B, 105C Initiators for 106A, 106B, 106C
106A, 106B, 106C Image triggering
107A, 107B, 107C Image matrices from 106A, 106B, 106C
107 Image matrix from IS
108 Image storage
109 Timer resetting
110, 111 Testing of abort conditions for 100
112 Image recording stop
113 Data transmission to server
195 System stop
A-A Optical axis of 6
B Base distance
b Width of 3, 3a, 3b, 3c, 3c1, 3c2, 3c3
$D_z$ Measuring range of z
$dz_A$ Resolution of $z_A$
$D_1$, $D_2$ End faces of 1, 1a
f Frequency
GPG Overall profilogram
H Distance 4/6 (FIG. 1)
IS Image selection in 100
Kv Correction value corresponding to v, $\omega$
Ko Correction value corresponding to area/position of 3, 3a, 3b, 3c, 3c1, 3c2, 3c3
k Factor corresponding to N1, N2 and $\Delta t$
L Working distance
LL Line length of 3, 3a, 3b, 3c, 3c1, 3c2, 3c3
M Lateral surface of 1, 1a
N1, N2 Distances between 3c1, 3c2, 3c3
O-O Optical axis of 2
P Profile
PG Profilograms
$PG_a$, $PG_b$, $PG_c$ Component profilograms
R Radius
RL Reflected light
v Translatory speed of 1, 1a
$t_k$, $t_1$, $t_2$, $t_3$ Measuring instants $S_1$, $S_2$, $S_3$ Points on the circumcircle around R
$sl_1$, $sl_2$, $sl_3$ Chord lengths for $S_1$, $S_2$, $S_3$
x Length coordinate
$x_A$ Image spot position of RL on 6
$x_{max}$ Maximum value of x
$x_{min}$ Minimum value of x
$x_1$, $x_2$, $x_3$ Measured values of length for $S_1$, $S_2$, $S_3$
y Length coordinate
z Height coordinate
$z_A$ Measured value, location of impingement of 3, 3a, 3b, 3c, 3c1, 3c2, 3c3
$z_B$ Corrected measured value of $z_A$
$z_{max}$ Maximum value of z
$z_{min}$ Minimum value of z
$z_1$ $z_2$, $z_3$ Measured values of height for $S_1$, $S_2$, $S_3$
ΔPG Profile deviation
Δt Time interval
ϕ Triangulation angle

The invention claimed is:

1. A method for contactlessly and dynamically detecting a profile (P) of a solid body, in particular for the purpose of determining wear occurring on the solid body, the method comprising the steps of:
generating at least one light beam by a laser device and expanding the light beam to form at least one linear light band,
projecting the light band onto at least one area of the surface of the solid body, moving the solid body past the laser device,
focusing the reflected light from the area of the surface of the solid body in an imaging device, whose optical axis is at a fixed triangulation angle (ϕ) to the direction of projection of the laser device and which is arranged at a fixed base distance (B) from the laser device,
detecting the light reflected at a frequency (f) that is high by comparison with a speed of movement of the solid body by means of a planar light receiving element outputting signals from the light receiving element as a function of the triangulation angle (ϕ) and the base distance (B) by means of trigonometric relations and in combination with correction values (Kv) determined in accordance with the speed of movement of the solid body,
obtaining with a data processing device measured values ($z_B$) of the profile (P) using the signals from the light receiving element,
storing the measured values ($z_B$) in the data processing device as a profilogram (PG),
using a number of profilograms as component profilograms ($PG_a$, $PG_b$, $PG_c$) by using at least three laser devices, that project light bands onto areas lying on various sides of the surface of the solid body, wherein the solid body has a shape that is substantially cylindrical and has at least three areas onto which the light bands are projected that lie on the two end faces and on the lateral surface of the cylinder,
using imaging devices assigned to said laser devices,
storing the component profilograms in the data processing system, and
obtaining an overall profilogram therefrom, wherein the overall profilogram of a rolling solid body is obtained from three component profilograms ($PG_a$, $PG_b$, $PG_c$) and determined simultaneously at one detection instant ($t_k$) by the two end faces and on the lateral surface, the detection instant ($t_k$) of the individual component profilograms ($PG_a$, $PG_b$, $PG_c$) being selected in such a way that a measured value ($z_k$) determined at this detection instant ($t_k$) assumes a maximum from at least three measured values ($z_1$, $z_2$, $z_3$) that lie on a circular arc of radius in one of the end faces ($D_1$, $D_2$) and are respectively determined at successive instants ($t_1$, $t_2$, $t_3$) and in a unidirectional fashion from the respective length of the linear light band, and that respectively correspond to half the length of a chord ($sl_1$, $sl_2$, $sl_3$) through the circular arc.

2. The method as claimed in claim 1, further comprising the steps of comparing one of the profilogram, the component profilograms ($PG_a$, $PG_b$, $PG_c$) and overall profilogram with at least one reference profilogram, and ascertaining the respective deviations (ΔPG) from the respective reference profilogram.

3. The method as claimed in claim 2, further comprising the step of referring one of the profilogram, the component profilograms ($PG_a$, $PG_b$, $PG_c$), the overall profilogram, the respective reference profilogram and the respective deviations (ΔPG) to a fixed long-term invariant geometric base quantity.

4. The method as claimed in claim 3, wherein the base quantity is determined from at least three measured values that are determined by contactless and dynamic measurements on the moving solid body and are undertaken in the same way as the detection of the profilogram or the detection of the component profilograms ($PG_a$, $PG_b$, $PG_c$).

5. The method as claimed in claim 4, further comprising the step of performing the contactless and dynamic measurements on the moving solid body in prescribed time intervals (Δt) at least three instants ($t_1$, $t_2$, $t_3$) by means of a single light beam expended to form a linear light band.

6. The method as claimed in claim 4, further comprising the step of simultaneously performing the contactless and dynamic measurements on the moving solid body by means of at least three light beams respectively expanded to form a linear light band in conjunction with a prescribed distance (N1, N2) of the areas of the surface of the solid body onto which the light bands are projected.

7. The method as claimed in claim 2 wherein at least one of the profilogram, the component profilograms ($PG_a$, $PG_b$, $PG_c$), the overall profilogram, the respective reference profilogram and the respective deviations (ΔPG) are based on a resolution ($dz_A$) of less than 2.0 mm.

8. The method of claim 2 further comprising the step of visualizing the respective reference profilogram (BP1, BP2) in an indicating device such as a display.

9. The method of claim 2 further comprising the step of visualizing the respective deviations (ΔPG) in an indicating device such as a display.

10. The method as claimed in claim 2 wherein at least one of the profilogram, the component profilograms ($PG_a$, $PG_b$, $PG_c$), the overall profilogram, the respective reference profilogram and the respective deviations (ΔPG) are based on a resolution ($dz_A$) of less than 0.5 mm.

11. The method as claimed in claim 3 wherein the base quantity is a radius (R) of a rolling rotationally symmetrical body, which is determined from the following system of equations:

$$R^2 = x_1^2 + z_1^2 \qquad (1)$$

$$R^2 = x_2^2 + z_2^2 \qquad (2)$$

$$R^2 = x_3^2 + z_3^2 \qquad (3)$$

$$x_1 - x_2 = k^*(x_2 - x_3) \qquad (4),$$

$z_1$, $z_2$, $z_3$ being three measured values lying on a circular arc of radius (R), respectively determined in a unidirectional fashion and corresponding to the ordinate (z) of a Cartesian coordinate system, of the length of the linear light band and which respectively correspond to half the length of a chord ($sl_1$, $sl_2$, $sl_3$) through the circular arc, $x_1$, $x_2$, $x_3$ being the abscissa values (x) respectively associated with these measured values, and k being a factor corresponding to prescribed time intervals ($\Delta t$) or distances (N1, N2) of the areas of the surface of the solid body.

12. The method of claim 3 wherein the base quantity is a non-wearing wheel rim inside diameter.

13. The method as claimed in claim 1 further comprising the steps of
   determining in a receiving loop a distance signal representing the distance between the solid body and the laser device,
   determining the speed of movement of the solid body as a temporal variation of the distance between the solid body and the laser device,
   selecting from image matrices acquired in an image triggering of the receiving loop—dependent on the speed of movement of the solid body—an image matrix being representative for the measured values ($Z_B$) of the profile,
   combining the measured values ($Z_B$) of the profile with correction values (Kv)
   determined in accordance with the speed of movement of the solid body
   and valid as permanently prescribed values in a time range of measuring, which is fixed dependent on the distance signal.

14. The method as claimed in claim 13, wherein a hardware component is incorporated in a test stand located on a rail in order to implement the receiving loop.

15. The method as claimed in claim 13, wherein the receiving loop is implemented in a client of a client-server circuit with a spatially remote server, at least one of the following operations being set in operation by a request from the server system start operations, activating a trigger for image triggering and switching on a laser device.

16. The method as claimed in claim 13, wherein provided in the receiving loop by a laser distance sensor downstream of signal conditioning is a distance signal from which initiators for the image triggering are obtained by a signal evaluation.

17. The method as claimed in claim 16, wherein the signal evaluation establishes logic and temporal links between the distance signal and the initiators for the image triggering by means of a programmable device that permits various time-based logic sequences to be configured.

18. The method as claimed in claim 13, wherein the image triggering provides image matrices that are buffered in a preferably cyclically operating, sequential image memory on the light receiving element.

19. The method as claimed in claim 18, wherein an image selection of an image matrix representative of the measured values ($z_B$) of the profile (P) is made from the image matrices as a function of the speed of the solid body.

20. The method as claimed in claim 13, wherein downstream of obtaining of the measured values ($z_B$) of the profile (P), the measured values ($z_B$) are sent to the server, together with respectively associated values of a distance from the laser device, of a measuring point in accordance with a light band used and a time of the image triggering.

21. The method as claimed in claim 13, wherein the receiving loop includes abort criteria condition checks that are connected to at least one of a timer and a number of predetermined measurements.

* * * * *